United States Patent

[11] 3,600,686

[72] Inventor James Richard Halsall
Reading, England
[21] Appl. No. 824,580
[22] Filed May 14, 1969
[45] Patented Aug. 17, 1971
[73] Assignee Imperial Chemical Industries Limited
London, England
[32] Priority May 22, 1968
[33] Great Britain
[31] 24417/68

[54] BINARY PULSE RATE MULTIPLIERS
3 Claims, 4 Drawing Figs.

[52] U.S. Cl. .......... 328/38, 328/48
[51] Int. Cl. .......... H03k 23/00
[50] Field of Search .......... 328/48, 38

[56] References Cited
UNITED STATES PATENTS

| | | | |
|---|---|---|---|
| 3,258,696 | 6/1966 | Heymann | 328/48 X |
| 3,263,174 | 7/1966 | Bjorkman et al. | 328/48 X |
| 3,369,183 | 2/1968 | Mester | 328/48 |

*Primary Examiner*—John S. Heyman
*Attorney*—Cushman, Darby and Cushman

ABSTRACT: This invention relates to a binary pulse rate multiplier for use in digital incremental control or instrumentation systems. Unlike known binary rate multipliers, the multiplier of the invention does not require any pulse shaping or differentiating circuits and comprises a plurality of bistable elements or flip-flops arranged to operate as a progressive binary or Gray code pulse counter, and means whereby the pulses arriving at the inputs to the bistable elements are routed to a combined output pulse line via individual pulse rate selection gates, so that energization of appropriate selection gates creates an output pulse train in the output pulse line having an average repetition rate which is a desired fraction of the average repetition rate of the input pulses applied to the counter by way of an input pulse line.

Inventor
James Richard Halsall
By Cushman, Darby & Cushman
Attorneys

Inventor
James Richard Halsall
By Cushman, Darby & Cushman
Attorneys

Inventor
James Richard Halsall
By Cushman, Darby & Cushman
Attorneys

Inventor
James Richard Halsall
By Cushman, Darby & Cushman
Attorneys

BINARY PULSE RATE MULTIPLIERS

This invention relates to a binary pulse rate multiplier for use, for example, in digital incremental control or instrumentation systems and special purpose computing systems.

Various known binary rate multipliers use binary counters which comprise a cascade of bistable elements or flip-flops with the output of each element (except the last) driving the input of the following element. The two stable states of such bistable elements or flip-flops are normally designated the 'O' and '1' states where the 'O' state represents the "off" condition and the '1' state represents the "on" condition. In such counters, the arrival of an input pulse will cause only one counter stage to change state from 0 to 1, whereas change of state from 1 to o can occur in several stages simultaneously. These 0 to 1 transitions are called noncarry conditions, and the 1 to 0 transitions are called carry conditions.

If pulses are derived from the 0 to 1 transitions and, since they occur at different times, they can be combined into a single output rate without risk of coincidence. Differentiation of the output states of the binary counter can yield a positive pulse for each 0 to 1 transition and a negative pulse for each 1 to 0 transition. The negative pulses from the differentiating circuits can be suppressed and the positive pulses shaped into rectangular form and, being noncoincident, these output pulse trains can be selectively combined to provide an output pulse train whose average repetition rate is any one of various fractions of the input repetition rate.

In these known binary rate multipliers, very precise techniques are needed to ensure that the pulse trains from each binary counter stage comprise pulses of equal duration and amplitude. It is an object of the present invention to provide a binary rate multiplier which does not require any pulse shaping or differentiating circuits.

According to the present invention a binary pulse rate multiplier comprises a plurality of bistable elements or flip-flops arranged to operate as a progressive binary or Gray code pulse counter, and means whereby the pulses arriving at the inputs to the bistable elements are routed to a combined output pulse line via individual pulse rate selection gates, so that energization of appropriate selection gates creates an output pulse train in the output pulse line having an average repetition rate which is a desired fraction of the average repetition rate of the input pulses applied to the counter by way of an input pulse line. Preferably, the circuit elements used in the construction of the binary pulse rate multiplier consist of resistors, semiconducting diodes and transistors.

It will, therefore, be appreciated that the pulse rate multiplier of this invention is based on a modified version of a gated Gray code pulse counter disclosed in my copending Pat. application No. 787,722, filed on Dec. 30, 1968, and entitled "-Counter For Electrical Pulses."

The coupling between the bistable elements or flip-flops may be controlled by means of multiple NOT-AND of NAND gates. Alternatively, the coupling between the bistable elements or flip-flops can be controlled by logical elements providing the same logical decisions, for example, NOT-OR or NOR gates or discrete combinations of AND-OR-NOT gates. The gates from the input pulse line to the inputs of each of the bistable elements or flip-flops, except the first bistable element or flip-flop, are controlled by the states of all previous bistable elements or flip-flops. In Table I and for completeness sets of logical elements are shown for producing equivalent logical functions using AND-OR-NOT, NAND and NOR elements.

Preferably, the bistable elements or flip-flops used are of the master-slave, for example, the so-called J.K. type which delay the change in output state until the initiating input pulse has terminated. Thus, any input pulse is prevented from causing more than one change in state of the counter output.

The gated method of operation of the binary pulse rate multiplier of the present invention makes it possible, when used with a polyphase pulse generator, (for example, a clock generator), to provide polyphase outputs having individual controlled binary rates. A polyphase clock generator may be used but it is not necessary to have strict timing providing separate phases are not coincident. One clock phase drives the counter and produces output pulse trains in the same manner as in the single phase binary rate multiplier. Each additional phase is applied to a separate additional set of gates which are also controlled by the same switching signals as the gates fed directly from the outputs of the respective bistable elements or flip-flops but which are not connected to the counter pulse line. Each of these additional gates provides a further binary pulse rate output from each stage of the counter which is in phase with a respective additional phase. By providing these additional gates with one extra input terminal they can also be used as pulse rate selection gates for the appropriate phase combined output.

The binary pulse rate multiplier of the invention may be included in a calculating apparatus.

In the calculating apparatus, the multiplier can also be used as a divider because the division of a quantity A by a quantity B is simply the multiplication of the quantity A by the reciprocal of the quantity B.

TABLE I

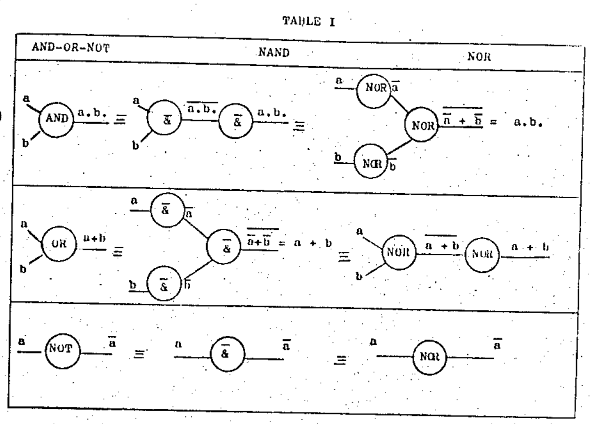

In Table I $a$ and $b$ represent two separate inputs.

The structures of the conventional binary code and the Gray code corresponding to the decimal numbers from 0 to 16 are shown in Table II below; where columns $a_1$ and $a_2$ represent the least significant digits in binary and Gray code respectively:

TABLE II

| Decimal Number | Binary Code | Gray Code |
|---|---|---|
| | $e_1\, d_1\, c_1 b_1\, a_1$ | $e_2\, d_2\, c_2\, b_2\, a_2$ |
| 0 | 0 0 0 0 0 | 0 0 0 0 0 |
| 1 | 0 0 0 0 1 | 0 0 0 0 1 |
| 2 | 0 0 0 1 0 | 0 0 0 1 1 |
| 3 | 0 0 0 1 1 | 0 0 0 1 0 |
| 4 | 0 0 1 0 0 | 0 0 1 1 0 |
| 5 | 0 0 1 0 1 | 0 0 1 1 1 |
| 6 | 0 0 1 1 0 | 0 0 1 0 1 |
| 7 | 0 0 1 1 1 | 0 0 1 0 0 |
| 8 | 0 1 0 0 0 | 0 1 1 0 0 |
| 9 | 0 1 0 0 1 | 0 1 1 0 1 |
| 10 | 0 1 0 1 0 | 0 1 1 1 1 |
| 11 | 0 1 0 1 1 | 0 1 1 1 0 |
| 12 | 0 1 1 0 0 | 0 1 0 1 0 |
| 13 | 0 1 1 0 1 | 0 1 0 1 1 |
| 14 | 0 1 1 1 0 | 0 1 0 0 1 |
| 15 | 0 1 1 1 1 | 0 1 0 0 0 110 |
| 16 | 1 0 0 0 0 | 1 1 0 0 0 |

The Gray code is a progressive code in which only one element changes state for each increment, therefore all transitions are noncoincident. The general condition for a change of state of the higher digits in the Gray code is for the next lower digit to be in the "1" state and all the lesser digits to be in the "0" state. By gating a pulse to the appropriate output each time an element changes either from 0 to 1 or from 1 to 0, a count of 0 to 15 will yield eight output pulses in column $a_2$, four in column $b_2$, two in column $c_2$ and one in column $d_2$. The pulses to be gated are those input pulses which cause the element to change state.

Also, as seen from Table II, for a count from 0 to 15, eight "noncarry" conditions occur in column $a_1$, four in column $b_1$, two in column $c_1$, and one in column $d_1$. Thus, the binary rated pulses obtained in the Gray code counter occur at the same intervals as those derived as a result of 0 to 1 transitions in known binary rate multipliers.

Specific embodiments of the invention will now be described, by way of example, with reference to the accompanying drawings, in which similar parts have similar references, and in which.

Figure 1:
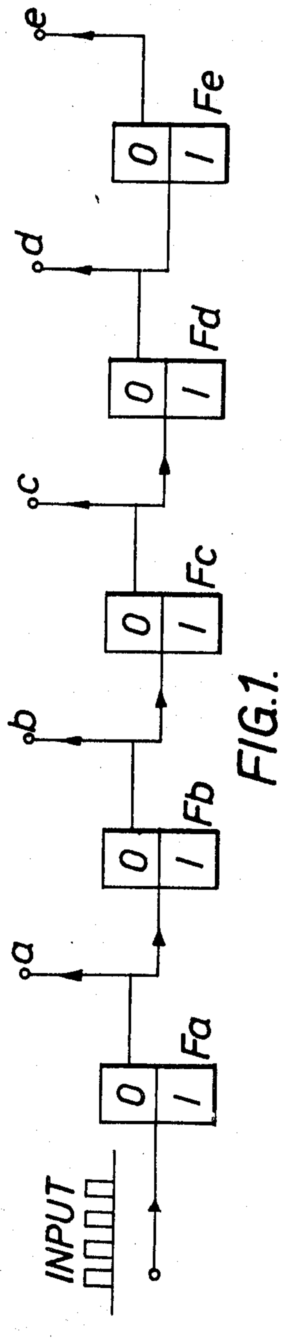
FIG.1. PRIOR ART
FIG. 1 illustrates a simple type of known counter for counting pulses in the binary code.

Referring to FIG. 1, there is illustrated a known ripple counter having a cascade of five (Fa to Fe) bistable elements or flip-flops, with the output of the five elements available at the terminals $a$ to $e$ respectively, and the output of each element (except the last) driving the input of the following element. The states of the bistable elements represent the binary number equivalent of the total number of pulses fed into the counter. Table II in columns $a_1$, $b_1$, $c_1$, $d_1$ and $e_1$ shows the states of the elements of the counter of FIG. 1 following the arrival of from 0 to 16 input pulses.

The counter of FIG. 1 can be used in a binary rate multiplier which accepts an input pulse train of a certain repetition rate and divides the input pulses by binary factors 2, 4, 8, 16 etc., to supply separate noncoincident pulse trains whose repetition rates are related in binary ratio. Because these output pulse trains are noncoincident they can be selectively combined to give an output pulse train whose average repetition rate is any one of various fractions of the input. For example, with an input rate of $x$ pulses per second the outputs representing $x/2$ and $x/8$ pulses per second could be selected to form a composite output rate of $5/8x$ pulses per second. This is the logical equivalent of multiplying $x$ by the binary number 0.1010, hence the use of the device as a multiplier.

Figure 2:
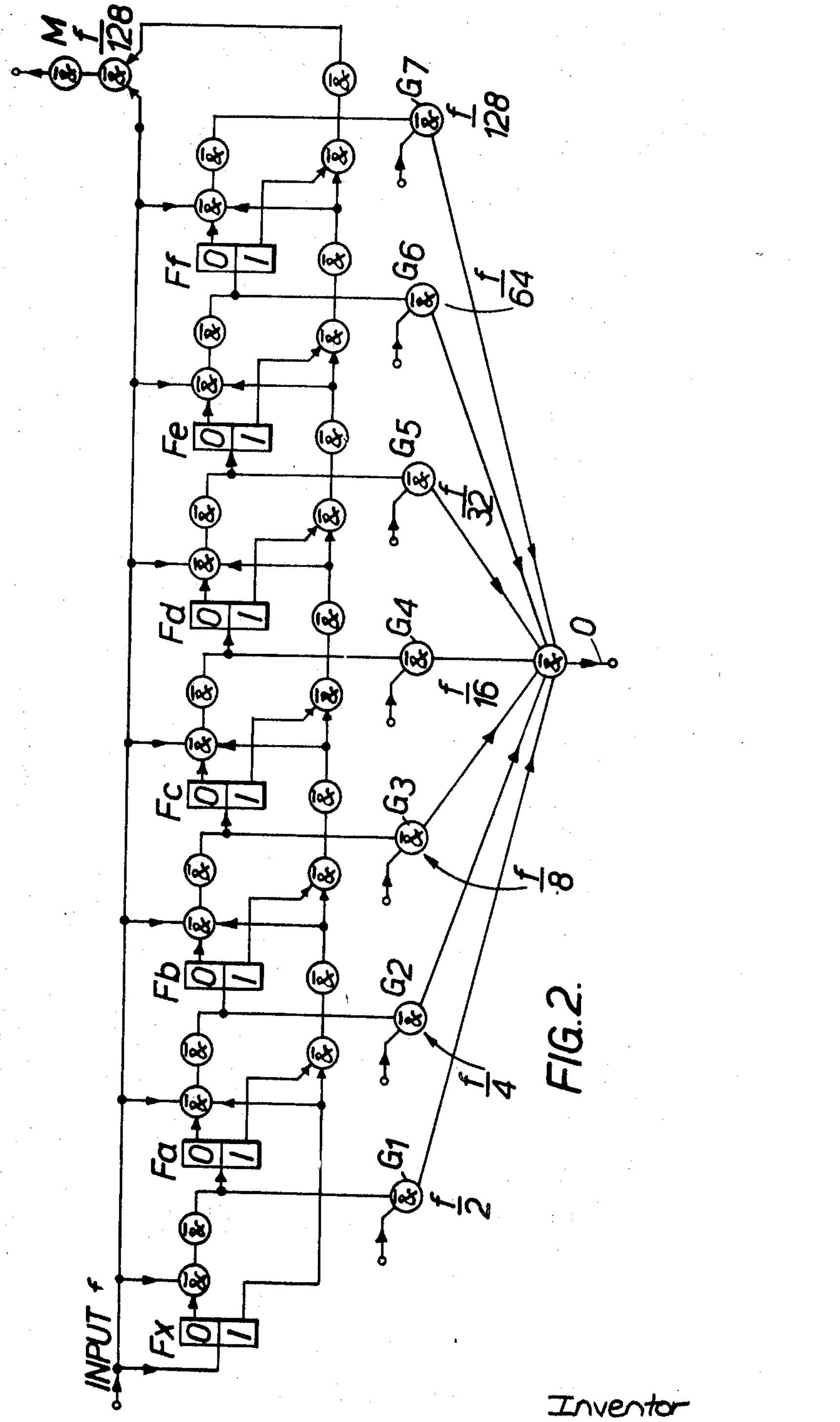
FIG. 2 illustrates a logical diagram of a seven-stage version of a binary pulse rate multiplier for single phase pulses, according to the invention.

Referring to FIG. 2, each stage of the seven-stage multiplier is identical, except the first and the last stages, and the multiplier can be extended to produce any desired number of stages. Coupling between the seven flip-flop stages F$x$, F$a$, F$b$, F$c$, F$d$, F$e$ and F$f$ is controlled by means of multiple NOT-AND or NAND gates . Each NAND gate supplies a logical output of '0' when all its inputs are set to a '1', and a logical output of '1' under any other set of input conditions.

All input pulses, having an average frequency $f$, are applied to the flip-flop F$x$ which therefore reverses state at the termination of each pulse. The gates from the input pulse line to the input of flip-flop F$a$ are controlled by the state of the flip-flop F$x$, which allows alternate input pulses to be applied to flip-flop F$a$. The gates from the input pulse line to the inputs of all other flip-flops F$b$ to F$f$ are controlled by the states of all previous flip-flops, and are arranged so that the flip-flops F$a$, F$b$, F$c$, etc., operate as a Gray code counter. Hence, one out of every four pulses is applied to the input of F$b$, one out of every eight pulses to the input of F$c$, the number of input pulses decreasing in binary ratio for each successive flip-flop.

The pulses arriving at the inputs to the Gray code counter flip-flops F$a$, F$b$, F$c$ etc. are also routed to the combined output pulse line 0 via individual pulse rate selection gates G1 to G7. By energizing the appropriate pulse rate selection gates G1 to G7, an output pulse train whose average repetition rate is any one of various fractions (0to 127/128) of the input can be obtained.

When fed with a continuous train of input pulses the counter operates as though it formed the initial stages of an infinitely long counter. The seven-stage counter illustrated in FIG. 2 can deliver a maximum of 127 output pulses to the output pulse line for every 128 pulses applied to the input pulse line. Thus, the maximum output to input pulse ratio is 127/128 corresponding to the sum of the series 1/2=1/4=1/8=1/16 =1/32=1/64=1/128. One out of every 128 input pulses would be passe on to operate the additional stages if the counter were extended in length. The inclusion of suitable gating at the end of the counter permits these pulses to be collected to produce a marker pulse M at the end of each complete pattern of 0 to 127 output pulses.

Figure 3:
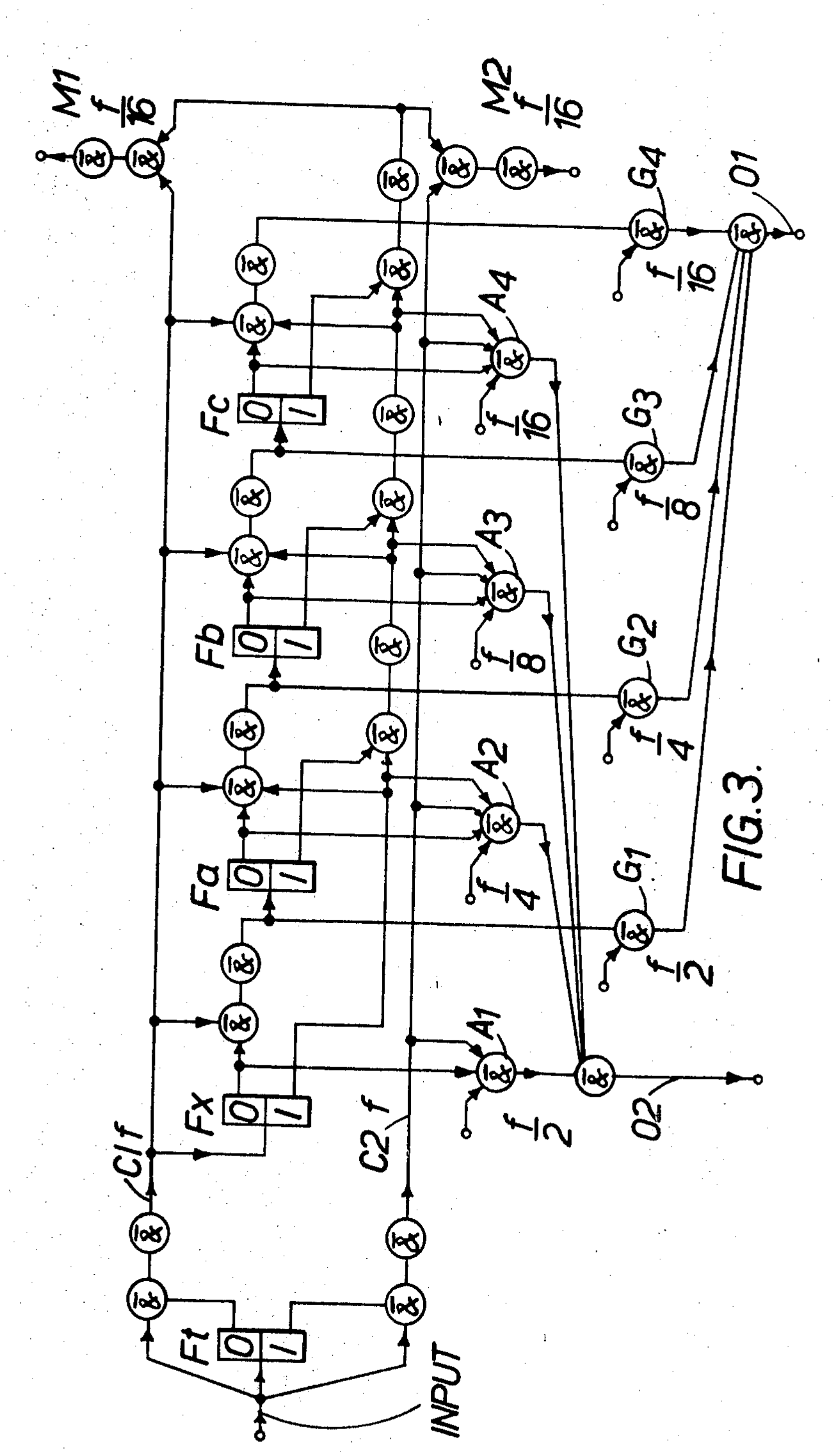
FIG. 3 illustrates a logical diagram of a four-stage version of a binary pulse rate multiplier for two phase pulses, according to the invention.

Referring to FIG. 3, the input two-phase (C1 and C2) clock pulses applied to flip-flop F$t$ cause it to reverse state at the end of each pulse, and by means of the gates controlled by its output states, alternative interlaced pulses are directed to the two separate clock-phase lines each of frequency $f$.

One clock-phase (phase C1) drives the counter and produces output pulse trains, 01 (0−15/16$f$) via pulse rate selection gates $G_1$, $G_2$, $G_3$ $G_4$, in the same manner as the single phase binary multiplier described with reference to FIG. 2. The second clock phase (phase C2)is applied to an additional set of gates $A_1$, $A_2$, $A_3$ and $A_4$, the latter three of which are also controlled by the same static switching signals as the cascaded gates fed directly from the flip-flops F$x$, F$a$, F$b$ and F$c$, but which are not connected to the counter pulse line. These additional gates $A_1$, $A_2$, $A_3$ $A_4$ produce a second binary pulse rate output from each stage of the binary rate multiplier which is in phase with the second clock phase. By providing these additional gates $A_1$, $A_2$, $A_3$, $A_4$ with one extra input terminal they can also be used as pulse rate selection gates for the second phase combined output as shown in FIG. 3 at 02 having a frequency (0−15/16$f$).

The arrangement of FIG. 3 can readily be extended to provide any desired number of output phases having individually controlled binary rates. For example, the two separate clock phases in FIG. 3 could each be split into two, to provide four separate phases, and the counter could control three external sets of gates to provide a total of four individually controlled binary rates. Since these outputs are derived from different phases of the same clock pulse generator (not shown), the pulses cannot be coincident and these outputs can, if desired, be combined.

Figure 4:
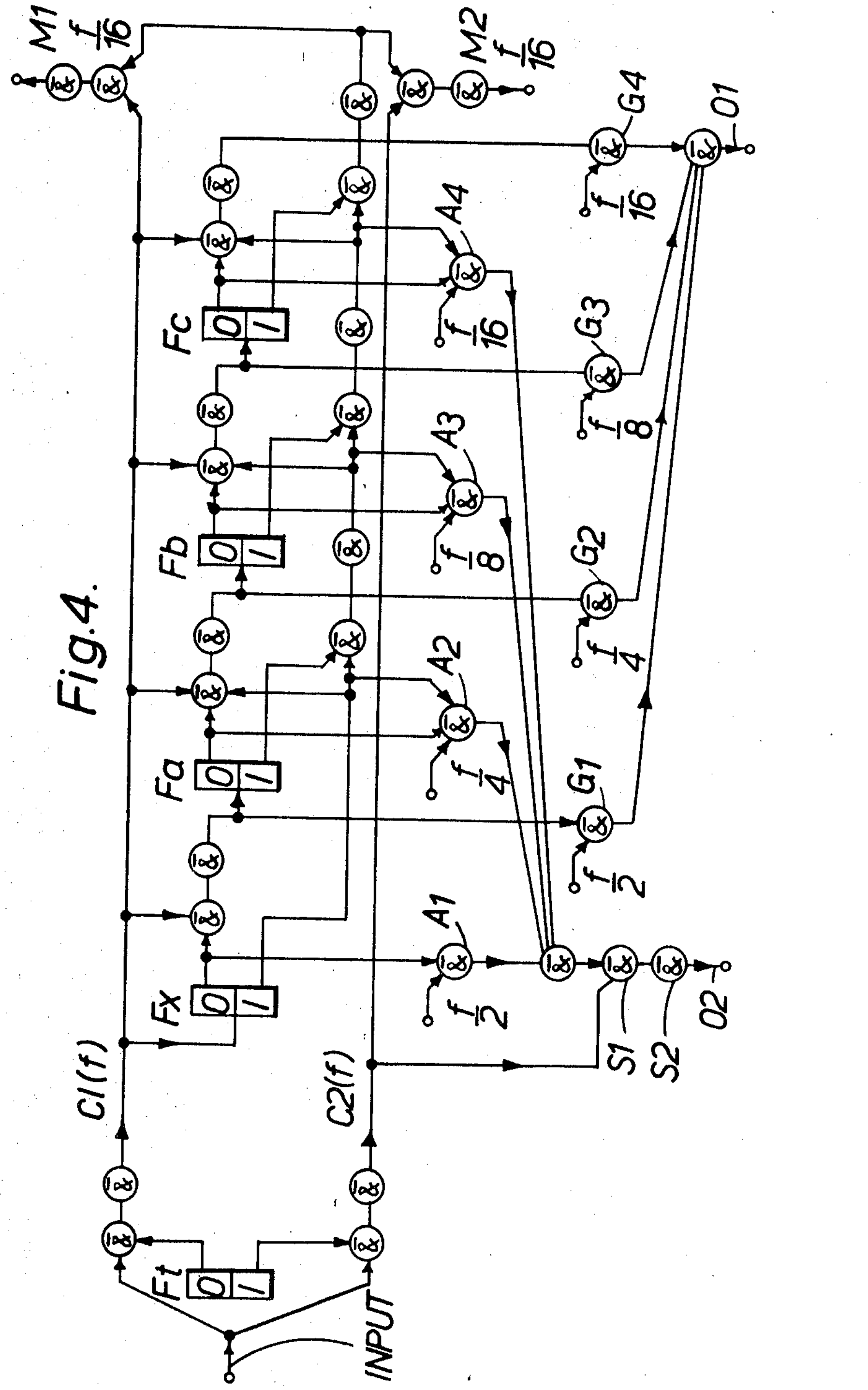
FIG. 4 illustrates a modification of the multiplier of FIG. 3.

Referring to FIG. 4, which illustrates a modification of the arrangement of FIG. 3, the second clock phase is not applied to the additional NAND gates $A_1$, $A_2$, $A_3$ and $A_4$, but is directed to two further NAND gates, combining gates $S_1$ and $S_2$. The gate is controlled by flip-flop F$x$ and gates $A_1$, $A_2$, $A_3$ and $A_4$ are controlled by the same static switching signals as cascaded gates which are fed directly by the flip-flops F$x$, F$a$, F$b$ and F$c$. The pulse rate selection signals for the second phase are applied to the gates $A_1$, $A_2$, $A_3$ and $A_4$, and outputs of the gates $A_1$, $A_2$, $A_3$ and $A_4$ are combined as static logic signals. The second clock phase signal is then added by the gates $S_1$ and $S_2$ to the combined static logic signals from the gates $A_1$, $A_2$, $A_3$ and $A_4$.

In the arrangement of FIG. 4, the gates $A_1$, $A_2$, $A_3$ and $A_4$ can be made as three-position NAND gates instead of four-position NAND gates, thereby reducing the cost of the multiplier. The arrangement of FIG. 4 can also be extended to any desired number of phases.

I claim:

1. A binary pulse rate multiplier suitable for implementation in integrated circuit elements, the binary pulse rate multiplier including a progressive binary pulse counter comprising:

a. n stages of flip-flops, each flip-flop being of a type which delays a change in its output stage until the initiating input to the flip-flop has terminated;

b. a single input line for receiving pulses to be counted;

c. a connection between the single input line and input to the flip-flop of the first stage;

d. a multiple enabling means associated with and following each flip-flop stage and having a first input connected to the output of the associated flip-flop and a second input from the single input line;

e. a cascaded chain of gating arrangements, the input to said chain comprising outputs from the first and second flip-flop stages, each gating arrangement of the chain subsequent to the first stage having connected as an additional input an output from respective flip-flop stages subsequent to the second stage;

f. means for connecting as an additional input to the enabling means between the first and second flip-flop stages that output from the first flip-flop stage which serves as an input to said chain;

g. means connecting outputs from said gating arrangements as additional inputs to respective enabling means subsequent to that following the second flip-flop stage; and wherein h. the enabling means following each flip-flop, except the flip-flop of stage n, provides the input for the next successive flip-flop and each enabling means provides a pulse output which is connected without differentiation or pulse shaping to a combined output pulse line through n individual pulse rate selection gates so that energization of appropriate selection gates creates an output pulse train in the combined output pulse line having an average repetition rate which is equal to the average repetition rate of the input pulses applied to the counter on the single input pulse line multiplied by the sum of the binary fractions associated with the energized selection gates.

2. A binary pulse rate multiplier according to claim 1, further comprising additional input lines and means for applying pulses of different clock phases to each of said input lines, one of said phases driving the counter and each of the different phases being applied to a separate additional set of pulse rate selection gates, said additional gates being electrically connected to said flip-flop stages and the cascaded chain of gating arrangements and being selectively conditioned so as to provide polyphase outputs from the multiplier having individually controlled binary rates.

3. A binary pulse rate multiplier according to claim 2, further comprising means for joining the output of each gate of each additional set of gates to a respective combining gate for producing an output pulse train from the respective combining gate having an average repetition rate which is a desired fraction of the average repetition rate of the input pulses of the clock phase applied to the associated input line.